US011167803B2

(12) United States Patent
Kim (10) Patent No.: US 11,167,803 B2
(45) Date of Patent: Nov. 9, 2021

(54) FRONT BODY OF VEHICLE

(71) Applicants:Hyundai Motor Company, Seoul (KR); Kia Motors Corporation, Seoul (KR)

(72) Inventor: Do Hoi Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 131 days.

(21) Appl. No.: 16/655,483

(22) Filed: Oct. 17, 2019

(65) Prior Publication Data

US 2020/0346694 A1 Nov. 5, 2020

(30) Foreign Application Priority Data

Apr. 30, 2019 (KR) .......................... 10-2019-0050399

(51) Int. Cl.
| | |
|---|---|
| *B62D 25/04* | (2006.01) |
| *B62D 25/08* | (2006.01) |
| *B62D 25/02* | (2006.01) |
| *B62D 27/02* | (2006.01) |
| *B62D 21/15* | (2006.01) |

(52) U.S. Cl.
CPC ........... *B62D 25/04* (2013.01); *B62D 25/025* (2013.01); *B62D 25/08* (2013.01); *B62D 27/02* (2013.01); *B62D 21/152* (2013.01); *B62D 27/023* (2013.01)

(58) Field of Classification Search
CPC ...... B62D 25/04; B62D 25/025; B62D 25/08; B62D 27/02; B62D 21/152; B62D 27/023

USPC ..................................................... 296/193.06
See application file for complete search history.

(56) References Cited

U.S. PATENT DOCUMENTS

| | | |
|---|---|---|
| 6,322,124 B1 | 11/2001 | Kim |
| 6,364,401 B1 | 4/2002 | Kim |
| 2010/0295336 A1 | 11/2010 | Itakura |
| 2016/0068115 A1* | 3/2016 | Inagawa ............... B60R 13/025 |
| | | 296/193.06 |
| 2016/0083015 A1 | 3/2016 | Kiyoshita et al. |
| 2016/0257345 A1 | 9/2016 | Hasegawa et al. |
| 2017/0313359 A1* | 11/2017 | Narahara ............. B62D 25/025 |
| 2017/0369102 A1 | 12/2017 | Kim et al. |

FOREIGN PATENT DOCUMENTS

| | | |
|---|---|---|
| DE | 10031995 A1 | 7/2001 |
| DE | 102010022151 A1 | 11/2010 |
| DE | 102015011080 A1 | 3/2016 |
| JP | 2002211436 A | 7/2002 |
| KR | 0124483 Y1 | 9/1998 |
| KR | 19980036976 U | 9/1998 |
| KR | 100320857 B1 | 1/2002 |
| KR | 101795403 B1 | 11/2017 |

* cited by examiner

*Primary Examiner* — D Glenn Dayoan
*Assistant Examiner* — Dana D Ivey
(74) *Attorney, Agent, or Firm* — Slater Matsil, LLP (57) ABSTRACT

A front body of a vehicle includes an A-pillar lower part configured with an inner panel and an outer panel to make a single member. The A-pillar lower part extends downward from a front end of an A-pillar and has a reinforcement panel between the inner panel and the outer panel. The reinforcement panel extends in a longitudinal direction to divide an inside of the A-pillar lower part into two members.

20 Claims, 8 Drawing Sheets

FRONT BODY OF VEHICLE

CROSS-REFERENCE TO RELATED APPLICATIONS

The present application claims priority to Korean Patent Application No. 10-2019-0050399, filed Apr. 30, 2019, the entire contents of which is incorporated herein for all purposes by this reference.

TECHNICAL FIELD

The present invention relates generally to a front body of a vehicle.

BACKGROUND

Generally, a vehicle collision may occur at various positions such as front, oblique, or offset collision. A vehicle is generally designed to minimize deformation at a passenger seat to protect a passenger, such that in a front collision, the front line of the vehicle absorbs shock while being optimally deformed and a front portion of the passenger seat close to the passenger seat is not substantially deformed.

In order to achieve the above objective, a front portion of a conventional front side member that is positioned at the front of the vehicle is designed with a material and a structure that are easily deformed, and a rear portion of the front side member is designed with a structure that has excellent rigidity and is not easily deformed.

However, in the structure, as rigidity of the rear portion of the front side member increases, a front portion and a rear portion of an A-pillar are significantly deformed, thereby causing a problem of deformation of the passenger seat. Therefore, there is a need for a new front structure of a vehicle that can more securely protect the passenger seat by increasing rigidity of the rear portion of the front side member and increasing rigidity of the A-pillar.

The foregoing is intended merely to aid in the understanding of the background of the present invention, and is not intended to mean that the present invention falls within the purview of the related art that is already known to those skilled in the art.

SUMMARY

The present invention relates generally to a front body of a vehicle. Particular embodiments relate to a front body of a vehicle capable of reducing deformation of a front portion of a passenger seat when a front, oblique, or offset collision occurs, so that safety of a passenger can be efficiently ensured.

Accordingly, embodiments of the present invention have been made keeping in mind the above problems occurring in the related art. Certain embodiments disclose a front body of a vehicle, wherein when a front, oblique, or offset collision occurs, deformation at a front portion of a passenger seat is reduced due to the front body, so that safety of a passenger can be efficiently ensured.

In order to achieve the above objective, according to one aspect of the present invention, a front body of a vehicle includes an A-pillar lower part configured with an inner panel and an outer panel to make a single member, extending downward from a front end of an A-pillar, having a reinforcement panel between the inner panel and the outer panel. The reinforcement panel may extend in a longitudinal direction to divide the inside of the A-pillar lower part into two members.

The front body may further include a side sill part having a shape extending from a lower end of a door of the vehicle along the longitudinal direction of the vehicle, and provided with a bracket at a front portion thereof so that the front portion is divided into two spaces on the basis of the bracket.

An upper end of the bracket may be connected to a lower end of the reinforcement panel, so the front portion of the side sill part may be configured with two members which are respectively connected to the divided members of the A-pillar lower part.

Each of the inner panel, the outer panel, and the reinforcement panel may have a front flange and a rear flange, and the reinforcement panel may be positioned between the inner and outer panels and be fixed between the inner and outer panels through the front flange and the rear flange.

The reinforcement panel may include: a dividing portion dividing the inside of the A-pillar lower part into the two members; the front flange extending forwardly from a first end of the dividing portion and fixed between the inner panel and the outer panel; and the rear flange extending backwardly from a second end of the dividing portion and fixed between the inner panel and the outer panel.

The front flange of the reinforcement panel may be formed in a shape of a gear in which protrusions and recesses are alternately arranged, and the protrusions of the front flange are fixed between the inner panel and the outer panel.

The reinforcement panel may include: the dividing portion dividing the inside of the A-pillar lower part into the two members; the front flange extending forwardly from the first end of the dividing portion and fixed between the inner panel and the outer panel; and the rear flange extending backwardly from the second end of the dividing portion and fixed to the inner panel.

The inside of the A-pillar lower part may be divided into a front member and a rear member on the basis of the reinforcement panel, and the front portion of the side sill part may be divided into a front sill and a rear sill on the basis of the bracket, and the front member may be connected to the front sill and the rear member may be connected to the rear sill.

The inner panel of the A-pillar lower part may be connected to an inner panel of the side sill panel to form a shape of a curved surface without having an angle, so that the inner panel of the A-pillar lower part and the inner panel of the side sill part may form an integral curved surface together.

An extension member may extend from a front side member, the extension member may be connected to the side sill part through a lower member, the bracket may extend into an inside of the lower member through the lower bracket, thereby dividing the lower member into a front lower sill and a rear lower sill, and the front lower sill may be connected to a front sill of the side sill part and the rear lower sill may be connected to a rear sill of the side sill part.

According to the front body of the vehicle of the present invention, the front body is provided to reduce deformation at the front portion of the passenger seat when a front, oblique, or offset collision occurs, so that the safety of the passenger can be efficiently ensured.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF ILLUSTRATIVE EMBODIMENTS

Hereinbelow, exemplary embodiments of the present invention will be described in detail with reference to the accompanying drawings. Throughout the drawings, the same reference numerals will refer to the same or like pails.

Figure 1:
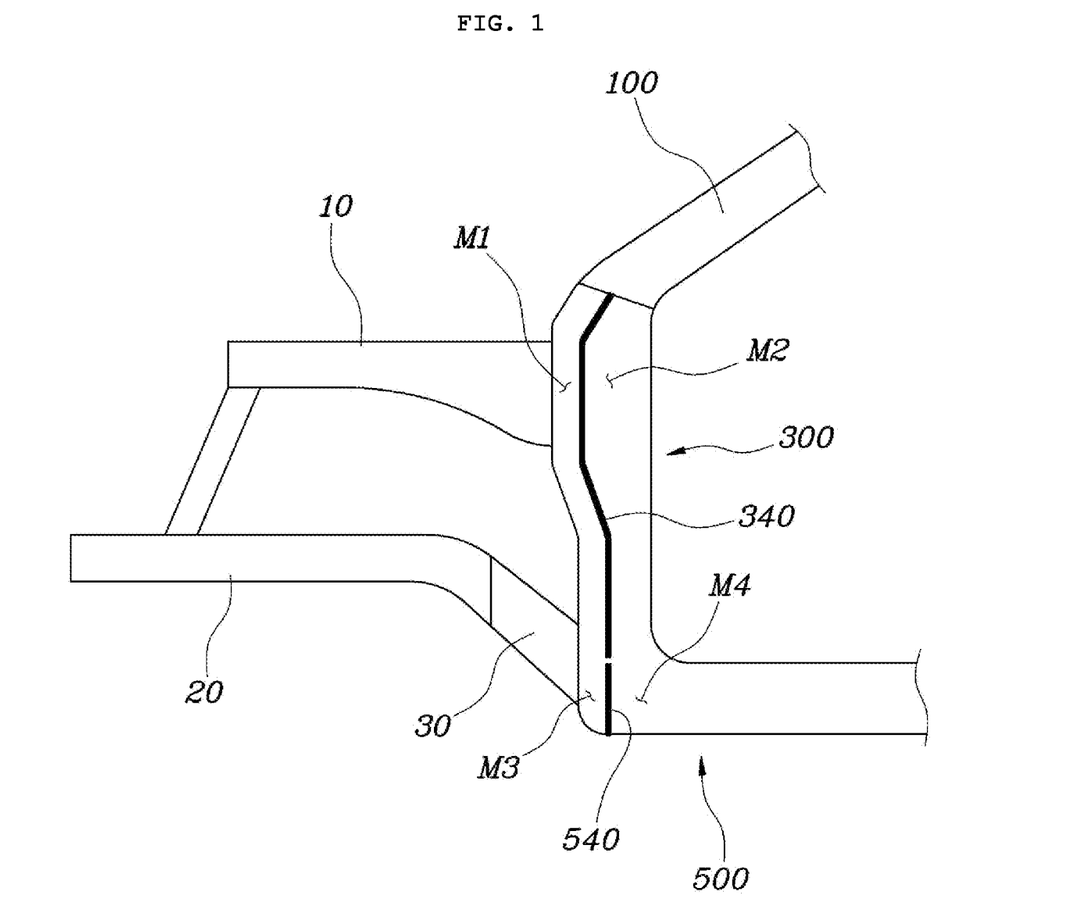
FIG. 1 is a view showing an entire structure of a front body of a vehicle according to an embodiment of the present invention.
Figure 2:
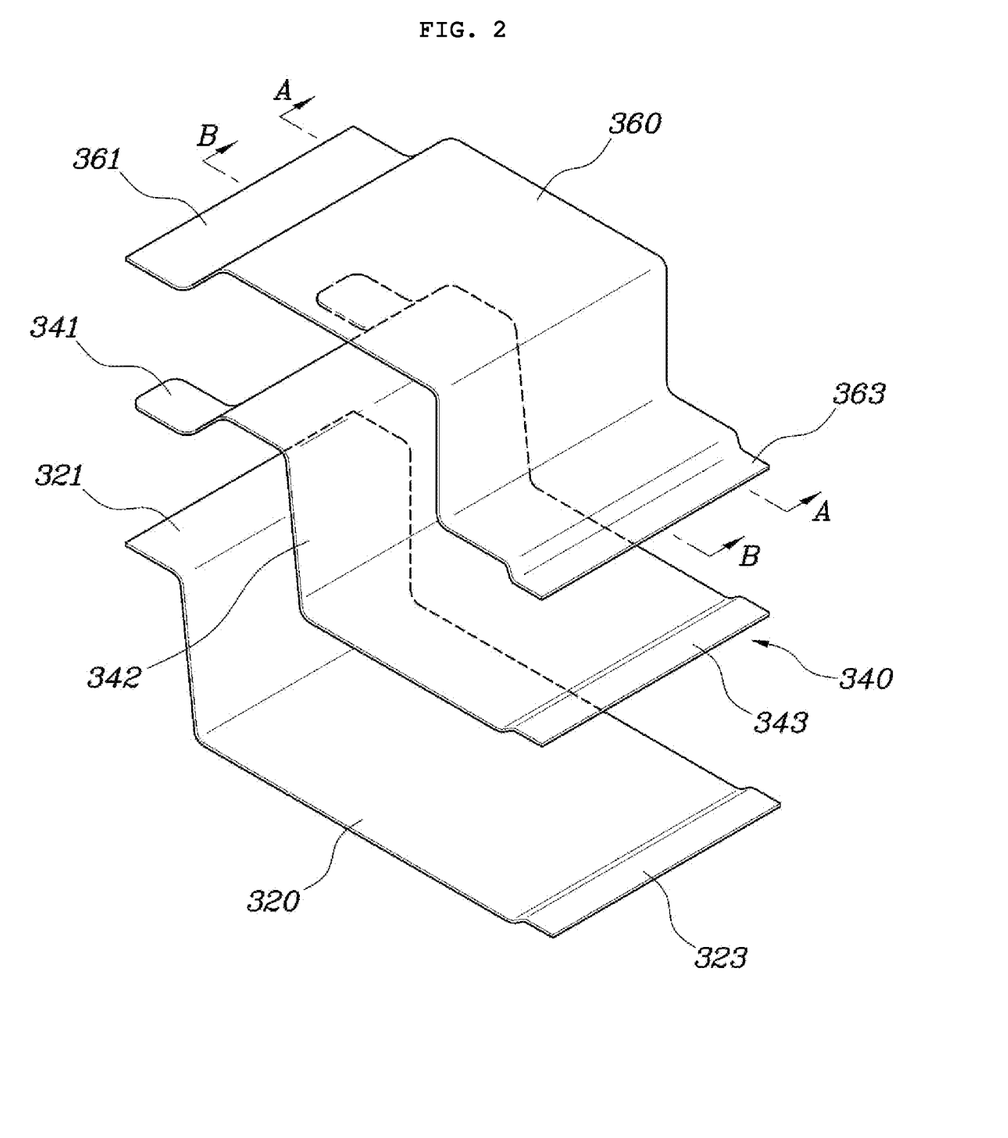
FIG. 2 is an exploded-perspective view showing an A-pillar lower part of the front body of the vehicle according to the embodiment of the present invention.
Figure 3:
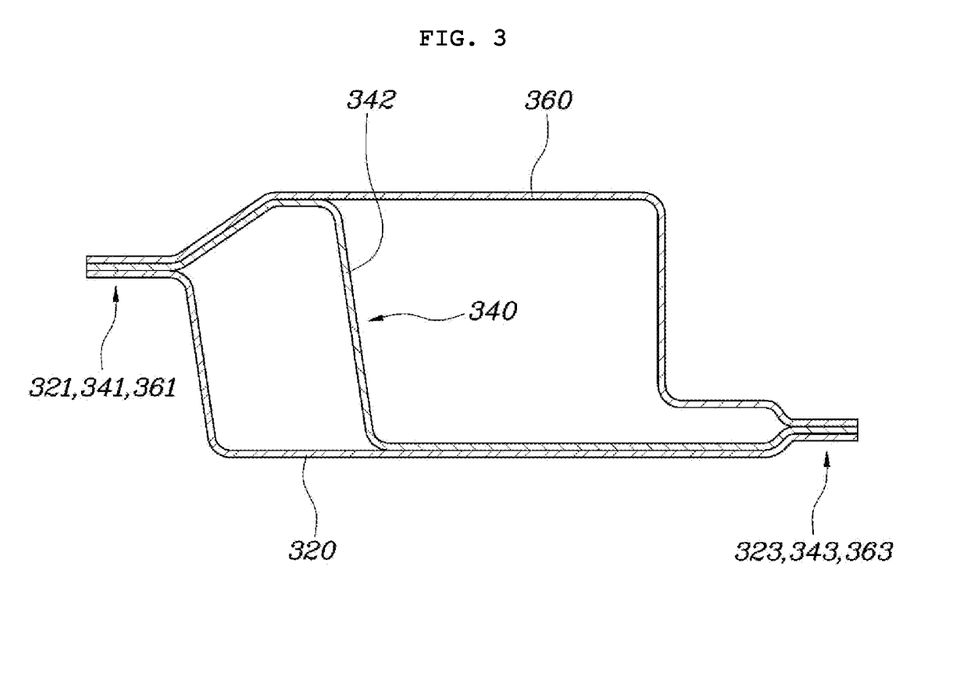
FIGS. 3 to 4 are sectional views showing the front body of the vehicle taken along A-A line and B-B line in FIG. 2.
Figure 4:
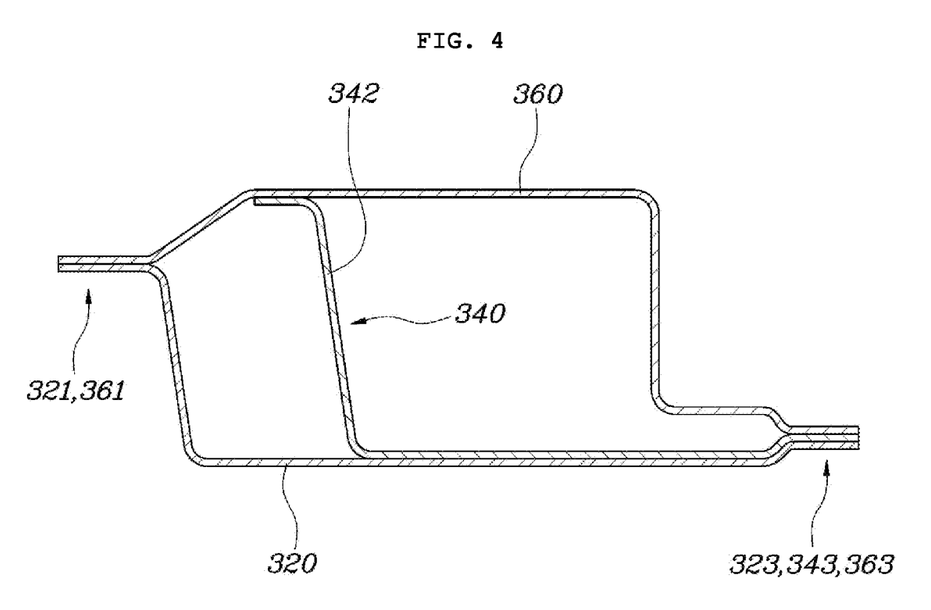
Figure 5:
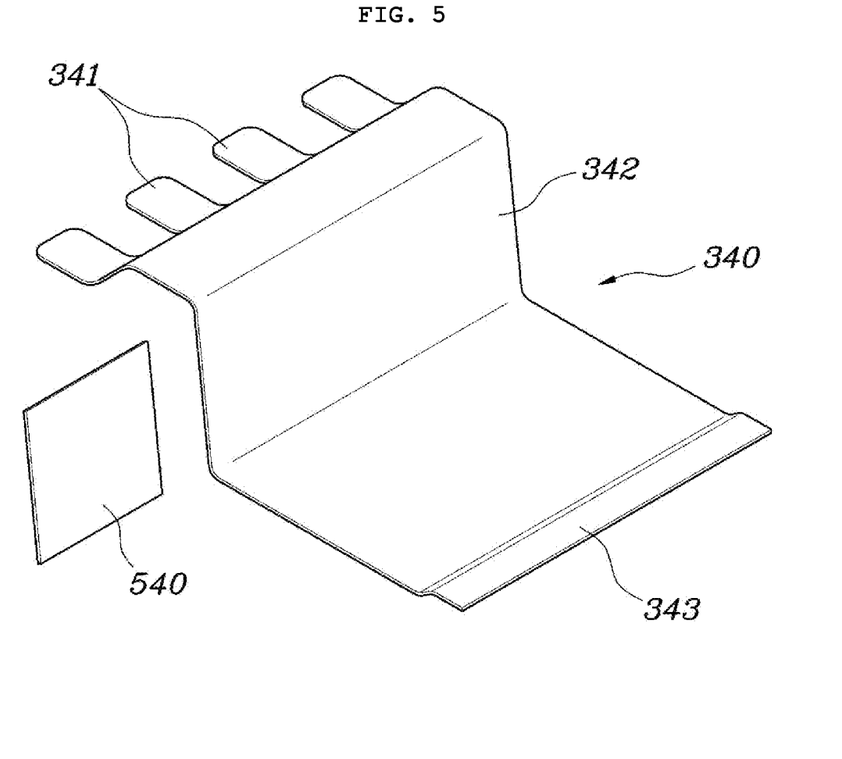
FIGS. 5 to 6 are perspective views showing embodiments of a reinforcement panel and a bracket of the front body of the vehicle according to the embodiment of the present invention.
Figure 6:
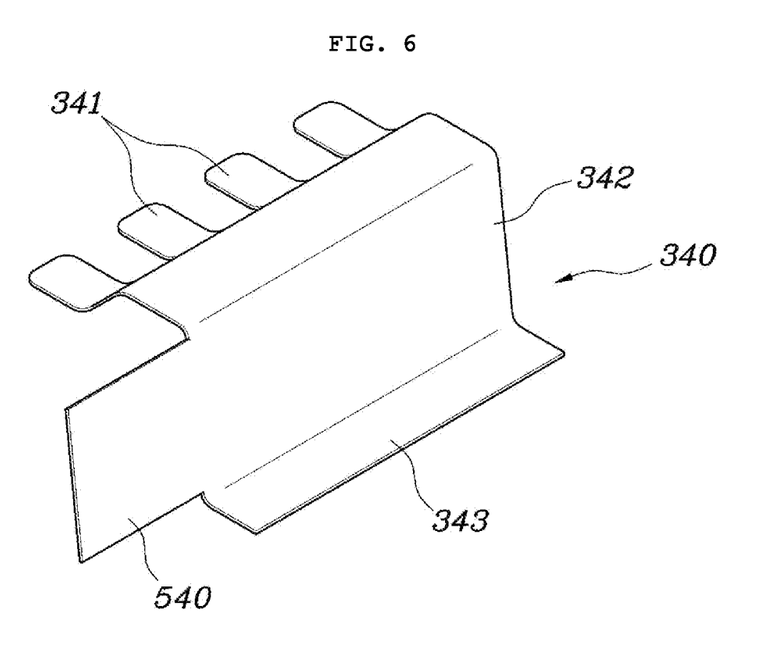
Figure 7:
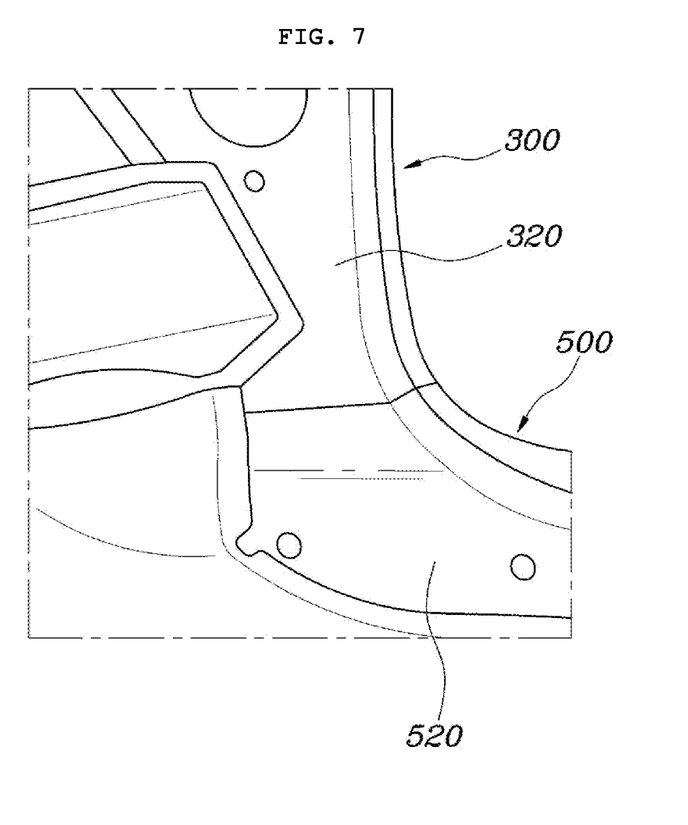
FIG. 7 is a view showing the front body of the vehicle in which the A-pillar lower part and a side sill part are coupled to each other according to the embodiment of the present invention.

FIG. 1 is a view showing an entire structure of a front body of a vehicle according to an embodiment of the present invention. FIG. 2 is an exploded-perspective view showing an A-pillar lower part of the front body of the vehicle according to the embodiment of the present invention. FIGS. 3 to 4 are sectional views showing the front body of the vehicle taken along A-A line and B-B line in FIG. 2. FIGS. 5 to 6 are perspective views showing embodiments of a reinforcement panel and a bracket of the front body of the vehicle according to the embodiment of the present invention. FIG. 7 is a view showing the front body of the vehicle in which the A-pillar lower part and a side sill part are coupled to each other according to the embodiment of the present invention.

FIG. 1 is the view showing the entire structure of the front body of the vehicle according to the embodiment of the present invention, the front body of the vehicle according to the present invention including: an A-pillar lower part 300. The A-pillar lower part 300 is configured with an inner panel 320 and an outer panel 360 to make a single member, having a shape extending downward from a front end of an A-pillar 100, having a reinforcement panel 340 between the inner panel 320 and the outer panel 360, and extending in a longitudinal direction of the reinforcement panel 340 so that the inside thereof is divided into two members.

The front body of the vehicle is provided with the A-pillar 100 and the A-pillar lower part 300 extending downward from the front of the A-pillar 100. In addition, a fender member 10 extends from the front of the A-pillar 100, a lower end of the A-pillar lower part 300 is connected to a side sill part 500 at a lower end of a door, and the front of the side sill part 500 is connected to a front side member 20 and an extension member 30.

Through the structure described above, when impact is applied to the front side member 20 due to front collision, a front portion of the front side member 20 absorbs the impact while being deformed, the impact is delivered to the side sill part 500 and the A-pillar lower part 300 through the front side member 20 and the extension member 30. Also, impact on the fender member 10 is delivered to the A-pillar lower part 300. Here, when strength of the A-pillar lower part 300 and the side sill part 500 is week, the impact delivered through the front side member 20 deforms the A-pillar lower part 300 and the side sill part 500 so that a passenger seat is deformed. Therefore, in order to increase collision rigidity of the A-pillar lower part 300 and the side sill part 500, the present invention is configured by providing each of the A-pillar lower part 300 and the side sill part 500 as a structure of two members.

Specifically, the A-pillar lower part 300 of the present invention has a shape extending downward from the front end of the A-pillar 100, and is configured with the inner panel 320 and the outer panel 360 to make a single member like a general A-pillar lower part. The reinforcement panel 340 is provided between the inner panel 320 and the outer panel 360, and the reinforcement panel 340 extends in the longitudinal direction thereof to allow the inside thereof to be divided into two members. Accordingly, when impact is applied from the front of the vehicle, higher collision rigidity is provided through the structure of two members.

In addition, the side sill part 500 is a member having a shape extending from the lower end of the vehicle door along a longitudinal direction of the vehicle. In the case of the side sill part 500, a bracket 540 is provided at the front inside the side sill part 500 and the inside of the front of the side sill part 500 is divided into two spaces on the basis of the bracket 540, this is to further provide collision rigidity through the overlapped two spaces when a front collision occurs.

Conventionally, an A-pillar lower part 300 and a side sill part 500 are respectively provided as single members so that they have a week structure when the front collision occurs. However, in the present invention, this front structure is provided such that the inside thereof is divided into two members, so that higher collision rigidity can be secured when a collision occurs.

FIG. 2 is the exploded-perspective view showing the A-pillar lower part of the front body of the vehicle according to the embodiment of the present invention. FIGS. 3 to 4 are sectional views showing the front body of the vehicle taken along line A-A and line B-B in FIG. 2.

As shown in the drawings, the inner panel 320, the outer panel 360, and the reinforcement panel 340 are respectively provided with a front flange 321, 341, and 361 and a rear flange 323, 343, and 363. The reinforcement panel 340 is provided between the inner panel 320 and the outer panel 360 and may be fixed between the inner panel 320 and the outer panel 360 through the front flange 341 and the rear flange 343.

Specifically, as FIG. 2 shows the exploded A-pillar lower part 300 of the front body of the vehicle according to the embodiment of the present invention, the reinforcement panel 340 may include a dividing portion 342 dividing the inside of the A-pillar lower part 300 into two members, the front flange 341 extending forwardly from a first end of the dividing portion 342 and fixed between the inner panel 320 and the outer panel 360, and the rear flange 343 extending backwardly from a second end of the dividing portion 342 and fixed between the inner panel 320 and the outer panel 360.

Through the structure described above, the reinforcement panel 340 divides the inside of the A-pillar lower part 300 into the two members. When the inner panel 320 and the outer panel 360 are assembled or welded together, the reinforcement panel 340 is added in the A-pillar lower part 300 without being changed from the existing design, so that a vehicle body may be easily manufactured.

In addition, the front flange 341 of the reinforcement panel 340 is formed in a shape of a gear in which protrusions and recesses are alternately arranged, and the protrusion of the front flange 341 may be fixed between the inner panel 320 and the outer panel 360. That is, the front flange 341 of the reinforcement panel 340 is assembled between the inner panel 320 and the outer panel 360 through the protrusion of the front flange 341 so that the assembly and matching of components may be easy.

The reinforcement panel 340 described above is shown in FIG. 5, and as another embodiment, the reinforcement panel 340 may include: the dividing portion 342 dividing the inside of the A-pillar lower part 300 into the two members; the front flange 341 extending forwardly from the first end of the dividing portion 342 and fixed between the inner panel 320 and the outer panel 360; and the rear flange 343 extending backwardly from the second end of the dividing portion 342 and fixed to the inner panel 320.

The other embodiment described above is shown in FIG. 6. In the reinforcement panel 340 according to the other embodiment, the rear flange 343 of the reinforcement panel 340 does not extend until between the inner panel 320 and the outer panel 360, and extends shortly and is fixed to only the inner panel 320. Therefore, the reinforcement panel 340 has an effect capable of dividing the inside of the A-pillar lower part 300 into two spaces and reducing weight of the A-pillar lower part 300 by decreasing the size of the reinforcement panel 340.

Meanwhile, an upper end of the bracket 540 of the side sill part 500 is connected to a lower end of the reinforcement panel 340, so that the front portion of the side sill part 500 may be provided as two members that are respectively connected to the divided members of the A-pillar lower part 300. That is, when the bracket 540 of the side sill part 500 is connected to the lower end of the reinforcement panel 340 as shown in FIGS. 1, 5, and 6, the inside of the front portion of the side sill part 500 is divided into two spaces.

In addition, the inside of the A-pillar lower part 300 is divided into a front member M1 and the rear member M2 on the basis of the reinforcement panel 340. The front portion of the side sill part 500 is divided into a front sill M3 and a rear sill M4 on the basis of the bracket 540. The front member M1 is connected to the front sill M3 and the rear member M2 is connected to the rear sill M4 so that there is an effect of extending a length of each member, thereby increasing the collision rigidity.

In addition, as shown in FIG. 6, when the bracket 540 is formed by extending from the dividing portion 342 of the reinforcement panel 340, the number of components may be reduced.

Figure 8:
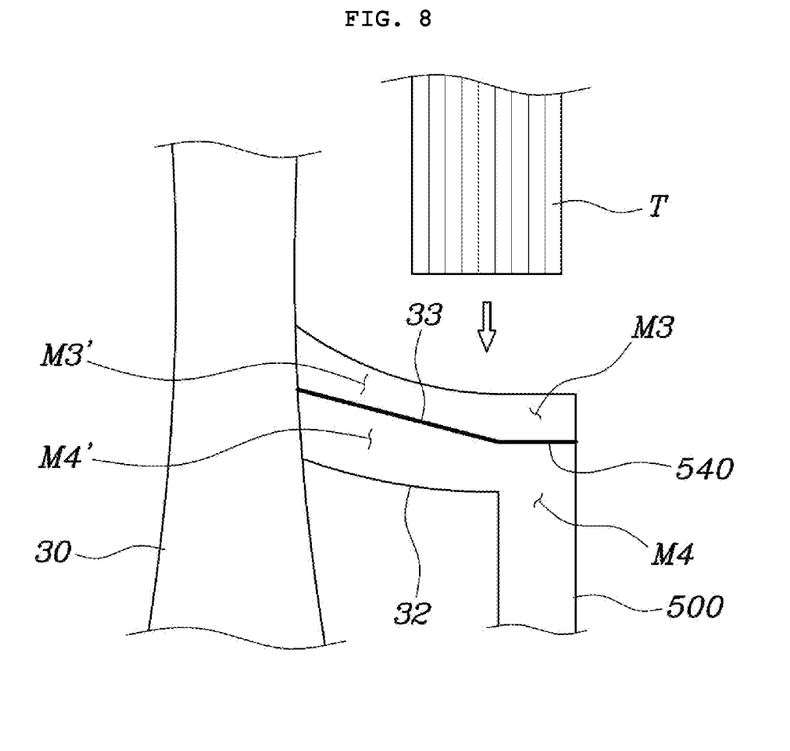
FIG. 8 is a view showing a connection relationship between the side sill part and a front side member of the front body of the vehicle according to the embodiment of the present invention.

Meanwhile, FIG. 8 is the view showing the connection relationship between the side sill part 500 and the front side member 20 of the front body of the vehicle according to the embodiment of the present invention. The extension member 30 extending from the front side member 20 is connected to the side sill part 500 through a lower member 32 and applies the impact therethrough. Here, the side sill part 500 is divided into the front sill M3 and the rear sill M4 by the bracket 540, and the lower member 32 is also provided with a lower bracket 33 therein. The lower bracket 33 may extend from the bracket 540 and divides the inside of the lower member 32 into a front lower sill M3' and a rear lower sill M4'. The front lower sill M3' is connected to the front sill M3 of the side sill part 500 and the rear lower sill M4' is connected to the rear sill M4 of the side sill part 500, so that a structure of two rooms are interconnected thereby reinforcing the strength of the front body. In the case of the structure, even when front collision occurs and a tire T applies impact to the lower member 32, deformation may be prevented by the structure constituted by the sills M3, M3', M4, and M4' of the lower member 32 and the side sill part 500 connected to each other, so that required collision rigidity may be secured.

In addition, FIG. 7 is a view showing the A-pillar lower part 300 and the side sill part 500 of the front body of the vehicle which are coupled to each other according to the embodiment of the present invention. The inner panel 320 is connected to an inner panel 520 of the side sill part 500 of the A-pillar lower part 300 to form a curved surface without an angle, and the inner panel 320 of the A-pillar lower part 300 and the inner panel 520 of the side sill part 500 may form an integral curved surface together.

Therefore, the inner panel 320 of the A-pillar lower part 300 forms the curved surface that is a similar plane same as the inner panel 520 of the side sill part 500, so that stress concentration on a connection portion may be reduced, the collision rigidity may be higher, and an edge portion of a door front portion may be formed in a core of a ring shape, thereby increasing strength.

In addition, referring to FIG. 1, the bracket 540 may be formed to extend into the extension member 30 that connects the side sill part 500 and the front side member 20 of the vehicle. Here, the bracket 540 may extend in a longitudinal direction with the extension member 30 so that the inside of the extension member 30 may be also divided into two members.

That is, the A-pillar lower part 300 is divided into the two members by the reinforcement panel 340. Among two members, the front member M1 positioned at the front is connected to the front sill M3 of the side sill part 500, and at the same time, the front member M1 communicates with a front space of the extension member 30 to form a load path formed by a single member.

In addition, the rear member M2 of the A-pillar lower pall 300 is connected to the rear sill M4 of the side sill part 500, and at the same time, the rear member M2 communicates with a rear space of the extension member 30 to form a load path formed by another member. Accordingly, the front body of the vehicle is provided with a structure of two overlapped load path members by which a conventional structure configured with a single load path member is divided into two members and overlapped together, so that higher collision rigidity may be secured.

According to the front body of the vehicle of the present invention, when front, oblique, or offset collision occurs, safety of passengers can be efficiently ensured by reducing deformation at a front portion of the passenger seat.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A front body of a vehicle, the front body comprising:
an A-pillar lower part configured with an inner panel and an outer panel to make a single member, the A-pillar lower part extending downward from a front end of an A-pillar and having a reinforcement panel between the inner panel and the outer panel, wherein the reinforce- ment panel extends in a longitudinal direction to divide an inside of the A-pillar lower part into a front member and a rear member;

wherein the reinforcement panel comprises a dividing portion dividing the inside of the A-pillar lower part into the front member and the rear member, a front flange extending forwardly from a first end of the dividing portion and fixed between the inner panel and the outer panel, and a rear flange extending backwardly from a second end of the dividing portion and fixed between the inner panel and the outer panel; and wherein the front flange of the reinforcement panel is formed in a shape of a gear in which protrusions and recesses are alternately arranged and where in the protrusions of the front flange are fixed between the inner panel and the outer panel.

2. The front body of claim 1, further comprising a side sill part having a shape extending from a lower end of the A-pillar lower part along the longitudinal direction of the vehicle, and provided with a bracket at a front portion thereof so that the front portion is divided into two spaces on the basis of the bracket.

3. The front body of claim 2, wherein an upper end of the bracket is connected to a lower end of the reinforcement panel, so the front portion of the side sill part is configured with two members that are respectively connected to the front member and the rear member of the A-pillar lower part.

4. The front body of claim 2, wherein the inside of the A-pillar lower part is divided into a front member and a rear member on the basis of the reinforcement panel;

wherein the front portion of the side sill part is divided into a front sill and a rear sill on the basis of the bracket; and wherein the front member is connected to the front sill and the rear member is connected to the rear sill.

5. The front body of claim 2, wherein the inner panel of the A-pillar lower part is connected to an inner panel of the side sill part to form a shape of a curved surface without having an angle, so that the inner panel of the A-pillar lower part and the inner panel of the side sill part form an integral curved surface together.

6. The front body of claim 2, wherein an extension member extends from a front side member, the extension member is connected to the side sill part through a lower member, the bracket extends into an inside of the lower member through a lower bracket, thereby dividing the lower member into a front lower sill and a rear lower sill, and the front lower sill is connected to a front sill of the side sill part and the rear lower sill is connected to a rear sill of the side sill part.

7. The front body of claim 2, wherein each of the inner panel, the outer panel, and the reinforcement panel has a front flange and a rear flange, and the reinforcement panel is positioned between the inner and outer panels and is fixed between the inner and outer panels through the front flange and the rear flange.

8. The front body of claim 2, wherein the reinforcement panel comprises:
a dividing portion dividing the inside of the A-pillar lower part into the front member and the rear member;
a front flange extending forwardly from a first end of the dividing portion and fixed between the inner panel and the outer panel; and
a rear flange extending backwardly from a second end of the dividing portion and fixed to the inner panel.

9. The front body of claim 1, wherein each of the inner panel, the outer panel, and the reinforcement panel has a front flange and a rear flange, and the reinforcement panel is positioned between the inner and outer panels and is fixed between the inner and outer panels through the front flange and the rear flange.

10. The front body of claim 1, wherein the reinforcement panel comprises:
a dividing portion dividing the inside of the A-pillar lower part into the front member and the rear member;
a front flange extending forwardly from a first end of the dividing portion and fixed between the inner panel and the outer panel; and
a rear flange extending backwardly from a second end of the dividing portion and fixed to the inner panel.

11. A vehicle comprising:
a vehicle body that includes an A-pillar and a side sill part;
wherein the A-pillar includes an A-pillar lower part configured with an inner panel and an outer panel to make a single member pillar;
wherein the A-pillar lower part extends downward from a front end of an A-pillar pillar;
wherein the A-pillar lower part has a reinforcement panel between the inner panel and the outer panel;
wherein the reinforcement panel extends in a longitudinal direction to divide an inside of the A-pillar lower part into a front member and a rear member;
wherein the reinforcement panel comprises a dividing portion dividing the inside of the A-pillar lower part into the front member and the rear member, a front flange extending forwardly from a first end of the dividing portion and fixed between the inner panel and the outer panel, and a rear flange extending backwardly from a second end of the dividing portion and fixed between the inner panel and the outer panel; and
wherein the front flange of the reinforcement panel is formed in a shape of a gear in which protrusions and recesses are alternately arranged and where in the protrusions of the front flange are fixed between the inner panel and the outer panel.

12. The vehicle of claim 11, wherein each of the inner panel, the outer panel, and the reinforcement panel has a front flange and a rear flange, and wherein the reinforcement panel is positioned between the inner and outer panels and is fixed between the inner and outer panels through the front flange and the rear flange.

13. The vehicle of claim 11, wherein the reinforcement panel comprises:
a dividing portion dividing the inside of the A-pillar lower part into the front member and the rear member;
a front flange extending forwardly from a first end of the dividing portion and fixed between the inner panel and the outer panel; and
a rear flange extending backwardly from a second end of the dividing portion and fixed to the inner panel.

14. A vehicle comprising:
a vehicle body that includes an A-pillar and a side sill part;
wherein the A-pillar includes an A-pillar lower part configured with an inner panel and an outer panel to make a single member pillar;
wherein the A-pillar lower part extends downward from a front end of an A-pillar pillar;
wherein the A-pillar lower part has a reinforcement panel between the inner panel and the outer panel;
wherein the reinforcement panel extends in a longitudinal direction to divide an inside of the A-pillar lower part into a front member and a rear member;
wherein the reinforcement comprises a dividing portion dividing the inside of the A-pillar lower part into the front member and the rear member, a front flange extending forwardly from a first end of the dividing portion and fixed between the inner panel and the outer panel, and a rear flange extending backwardly from a second end of the dividing portion and fixed between the inner panel and the outer panel;

wherein the front flange of the reinforcement panel is formed in a shape of a gear in which protrusions and recesses are alternately arranged and where in the protrusions of the front flange are fixed between the inner panel and the outer panel; and wherein the side sill part having a shape extends from a lower end of the A-pillar lower part along the longitudinal direction of the vehicle body and is provided with a bracket at a front portion thereof so that the front portion is divided into two spaces on the basis of the bracket.

15. The vehicle of claim 14, wherein an upper end of the bracket is connected to a lower end of the reinforcement panel, so the front portion of the side sill part is configured with two members that are respectively connected to the front member and the rear member of the A-pillar lower part.

16. The vehicle of claim 14, the front portion of the side sill part is divided into a front sill and a rear sill on the basis of the bracket and wherein the front member is connected to the front sill and the rear member is connected to the rear sill.

17. The vehicle of claim 14, wherein the inner panel of the A-pillar lower part is connected to an inner panel of the side sill part to form a shape of a curved surface without having an angle, so that the inner panel of the A-pillar lower part and the inner panel of the side sill part form an integral curved surface together.

18. The vehicle of claim 14, wherein an extension member extends from a front side member;

wherein the extension member is connected to the side sill part through a lower member;

wherein the bracket extends into an inside of the lower member through a lower bracket, thereby dividing the lower member into a front lower sill and a rear lower sill; and wherein the front lower sill is connected to a front sill of the side sill part and the rear lower sill is connected to a rear sill of the side sill part.

19. The vehicle of claim 14, wherein each of the inner panel, the outer panel, and the reinforcement panel has a front flange and a rear flange, and wherein the reinforcement panel is positioned between the inner and outer panels and is fixed between the inner and outer panels through the front flange and the rear flange.

20. The vehicle of claim 14, wherein the reinforcement panel comprises:

a dividing portion dividing the inside of the A-pillar lower part into the front member and the rear member;

a front flange extending forwardly from a first end of the dividing portion and fixed between the inner panel and the outer panel; and a rear flange extending backwardly from a second end of the dividing portion and fixed to the inner panel.

\* \* \* \* \*